United States Patent
Zhang et al.

(10) Patent No.: US 12,224,589 B2
(45) Date of Patent: Feb. 11, 2025

(54) OPERATION DECISION-MAKING METHOD FOR CENTRALIZED CLOUD ENERGY STORAGE CAPABLE OF PARTICIPATING IN POWER GRID AUXILIARY SERVICES

(71) Applicant: Tsinghua University, Beijing (CN)

(72) Inventors: Ning Zhang, Beijing (CN); Jingkun Liu, Beijing (CN); Yi Wang, Beijing (CN); Chongqing Kang, Beijing (CN)

(73) Assignee: TSINGHUA UNIVERSITY, Beijing (CN)

(*) Notice: Subject to any disclaimer, the term of this patent is extended or adjusted under 35 U.S.C. 154(b) by 510 days.

(21) Appl. No.: 17/824,113

(22) Filed: May 25, 2022

(65) Prior Publication Data
US 2022/0294224 A1   Sep. 15, 2022

Related U.S. Application Data

(63) Continuation of application No. PCT/CN2020/074192, filed on Feb. 3, 2020.

(30) Foreign Application Priority Data

Nov. 28, 2019 (CN) .......................... 201911191015.X

(51) Int. Cl.
*H02J 3/28* (2006.01)
*G05B 19/042* (2006.01)
*H02J 3/00* (2006.01)

(52) U.S. Cl.
CPC .............. *H02J 3/28* (2013.01); *G05B 19/042* (2013.01); *H02J 3/003* (2020.01); *G05B 2219/2639* (2013.01); *H02J 2203/20* (2020.01)

(58) Field of Classification Search
CPC .......... H02J 3/28; H02J 3/003; H02J 2203/20; H02J 3/32; H02J 2203/10; H02J 3/008; H02J 3/24; H02J 3/46; H02J 13/00; H02J 15/00; G05B 19/042; G05B 2219/2639; Y02E 40/70; Y04S 10/12; Y04S 10/14
See application file for complete search history.

(56) References Cited

U.S. PATENT DOCUMENTS

| | | | |
|---|---|---|---|
| 2016/0091904 A1* | 3/2016 | Horesh | F24F 11/58 |
| | | | 700/276 |
| 2019/0181642 A1* | 6/2019 | Cowen, III | G05B 13/042 |
| 2019/0219293 A1* | 7/2019 | Wenzel | G06Q 50/06 |
| 2020/0059098 A1* | 2/2020 | Dong | G06Q 50/06 |

OTHER PUBLICATIONS

WIPO, International Search Report for PCT/CN2020/074192, Jun. 30, 2020.

* cited by examiner

*Primary Examiner* — Zhipeng Wang
(74) *Attorney, Agent, or Firm* — Hodgson Russ LLP

(57) ABSTRACT

An operation decision-making method for centralized cloud energy storage capable of participating in power grid auxiliary services. The method includes: establishing a model predictive control model; obtaining operating parameters of the current period t from a grid control center at a beginning of a current decision-making cycle; predicting operating parameters within the predetermined time range based on historical data; obtaining decision variables according to the model predictive control model, the operating parameters of the current period and the operating parameters within the predetermined time range; setting a charging power of the centralized energy storage facility in the current period t and a discharging power according to the decision variables; obtaining an actual power of the centralized energy storage facility at an end of the current period t through sensors installed on the centralized energy storage facility as a parameter for a next decision period.

7 Claims, No Drawings

OPERATION DECISION-MAKING METHOD FOR CENTRALIZED CLOUD ENERGY STORAGE CAPABLE OF PARTICIPATING IN POWER GRID AUXILIARY SERVICES

CROSS-REFERENCE TO RELATED APPLICATION

The present application is a continuation of International Application No. PCT/CN2020/074192, filed Feb. 3, 2020, which claims priority to Chinese Patent Application No. 201911191015.X, filed Nov. 28, 2019, the entire disclosures of which are incorporated herein by reference.

FIELD

The disclosure relates to an operation decision-making method for centralized cloud energy storage capable of participating in power grid auxiliary services, which belongs to an application field of energy storage technology in power grid.

BACKGROUND

With the promotion of distributed power generation technology and real-time electricity prices, users increasingly hope to independently choose energy storage devices and their charging and discharging timing to achieve reasonable energy storage resource utilization.

At present, there is no detailed report on cloud energy storage systems that can participate in grid auxiliary services and their use of MPC methods to participate in grid auxiliary services decision-making.

SUMMARY

Embodiments of the present disclosure propose an operation decision-making method for centralized cloud energy storage capable of participating in power grid auxiliary services. The method includes: establishing a model predictive control model, wherein the model predictive control model includes an objective function representing a minimization of a sum of an operating cost generated by a centralized energy storage facility during a current period t and an expected operating cost generated within a predetermined time range $T_p$, and constraint conditions including charge and discharging power constraints, minimum power constraints of the centralized energy storage facility, electricity constraints of the centralized energy storage facility, and electricity constraints of the centralized energy storage facility in adjacent periods; obtaining, by a cloud energy storage service provider, operating parameters of the current period t from a grid control center at a beginning of a current decision-making cycle; predicting, by the cloud energy storage service provider, operating parameters within the predetermined time range based on historical data; obtaining decision variables according to the model predictive control model, the operating parameters of the current period and the operating parameters within the predetermined time range; setting, by the cloud energy storage service provider, a charging power of the centralized energy storage facility in the current period t and a discharging power according to the decision variables, so as to enable the centralized energy storage facility to work according to the charging power and the discharging power; obtaining, by the cloud energy storage service provider, an actual power of the centralized energy storage facility at an end of the current period t through sensors installed on the centralized energy storage facility as a parameter for a next decision period.

DETAILED DESCRIPTION

In order to make the objectives, technical solutions, and advantages of the present disclosure clearer, the present disclosure will be further described in detail below in conjunction with embodiments. It should be understood that the specific implementations described here are only used to explain the present disclosure and do not limit the protection scope of the present disclosure.

In the related arts, users who invest in local physical energy storage devices may face excessive unit costs and require a certain amount of energy for maintenance. Using shared cloud virtual energy storage to replace the user's local physical energy storage device is a better alternative, such as an existing cloud energy storage device for residential and small users (Liu J, Zhang N, Kang C, et al. Cloud energy storage for residential and small commercial consumers: A business case study [J]. Applied Energy. 2017, 188: 226-236). The existing cloud energy storage concept is a grid-based shared energy storage technology that allows users to use shared energy storage resources composed of centralized or distributed energy storage facilities anytime, anywhere, and on demand, and to pay for the service according to using requirements. The existing cloud energy storage system mainly includes 4 parts, namely cloud energy storage users, cloud energy storage service providers, centralized energy storage facilities, and power grids. Two-way energy transmission is realized through electrical connections between cloud energy storage users and the grid, and between centralized energy storage facilities and the grid. The two-way transmission of information between cloud energy storage users and the power grid, between cloud energy storage users and cloud energy storage service providers, and between cloud energy storage service providers and centralized energy storage facilities may be realized through wired or wireless communication, respectively. The power grid transmits information unidirectionally to cloud energy storage service providers.

Cloud energy storage service providers control energy storage devices to meet the charging and discharging needs of cloud energy storage users, while maximizing the use of energy storage resources. Available energy storage resources are not only shared by many cloud energy storage users, but also dynamically allocated to corresponding cloud energy storage users based on charging and discharging requirements. The system operation efficiency may be improved by optimizing planning and coordinated control of energy storage facilities. The cloud energy storage has changed the original trend by charging and discharging from the distribution feeder. Cloud energy storage users and energy storage facilities are in the same power distribution network. When a cloud energy storage user charges its allocated energy storage resources, the energy storage facility is charged by sucking energy into the grid. When a cloud energy storage user discharges the cloud battery to use the stored energy, the energy storage facility releases energy to the grid to compensate for the load of the corresponding user.

Cloud energy storage service providers can take advantage of the complementarity and non-simultaneity of charging and discharging requirements among massive distributed users to realize that the energy capacity and power capacity of the energy storage facilities they build are lower than the sum of energy capacity demands the sum of the power capacity demand of all distributed users, respectively.

Nowadays, energy and information and communication technology are increasingly deeply integrated, which provides hardware and software support for the construction of cloud energy storage systems. The current cloud energy storage system does not consider the application of the centralized energy storage device corresponding to the cloud energy storage to the auxiliary service of the grid in the decision-making process, it only considers how to use the energy storage resources to serve the cloud energy storage users, which does not maximize the value of energy storage resources.

In addition, Model Predictive Control (MPC) theory (see the following papers: Liu Xiangjie, Kong Xiaobing. Model predictive control of complex systems in the power industry-status quo and development. Proceedings of the Chinese Society for Electrical Engineering, 2013, 33(05): 79-85) is an optimal control theory. This theory came out in the 1970s. It is mainly aimed at control problems with optimization requirements and has successful applications in complex industrial control. On basis of information that can be obtained at the current moment and information predicted for the future, this theory only adopts the control strategy at the current moment after optimizing the solution of the control strategy, and obtains the real-time control strategy through rolling optimization. This theory can be used to determine the parameters in the power system dispatch model, such as unit output.

The present disclosure proposes an operation decision-making method for centralized cloud energy storage capable of participating in power grid auxiliary services. The present disclosure has following characteristics and beneficial effects.

To solve the problem that existing cloud energy storage systems cannot participate in grid auxiliary services, the present disclosure improves a decision model of cloud energy storage service providers, so that cloud energy storage service providers can participate in auxiliary services of the grid, by responding to the charging and discharging commands issued by the grid control center, the participation of the auxiliary services such as the frequency modulation and peak shaving of the power grid can be realized. In order to improve the accuracy of decision-making, cloud energy storage service providers adopt the idea of model predictive control in their operational decision-making, and make rolling decisions on the charging and discharging instructions of current centralized energy storage facility based on existing and predicted information.

The method of the present disclosure can broaden the source of grid auxiliary service participants, provide beneficial support for auxiliary service requirements such as frequency modulation and peak shaving of the grid, and can further improve the utilization rate of the centralized energy storage facility in the cloud energy storage system. Cloud energy storage service providers can use more predicted parameters to make their operational decisions to meet the requirements of cloud energy storage users for charging and discharging and grid auxiliary services more scientific and reasonable.

The method proposed in embodiments of the present disclosure includes the following steps:

1) A model predictive control model is established as follows.

1-1) Suppose an objective function of the model predictive control model as:

$$\min_{P_t^{C,CU}, P_t^{C,AS}, P_t^{D,CU}, P_t^{D,AS}, E_t, P_\tau^{C,CU}, P_\tau^{C,AS}, P_\tau^{D,CU}, P_\tau^{D,AS}, E_\tau} C_t^O =$$

$$\Delta t [\lambda_t (P_t^{C,CU} - P_t^{D,CU} + p_t^{D\Sigma} - p_t^{C,DG\Sigma})^+ +$$

$$\theta_t (P_t^{C,CU} - P_t^{D,CU} + p_t^{D\Sigma} - p_t^{C,DG\Sigma})^- + \mu_t^C (A_t^C - P_t^{C,AS}) - \rho_t^C P_t^{C,AS} +$$

$$\mu_t^D (A_t^D - P_t^{D,AS}) - \rho_t^D P_t^{D,AS}] + \sum_{\tau \in T_t} \Delta t [\hat{\lambda}_\tau (P_\tau^{C,CU} - P_\tau^{D,CU} + \hat{p}_\tau^{D\Sigma} - \hat{p}_\tau^{C,DG\Sigma})^+ +$$

$$\hat{\theta}_\tau (P_\tau^{C,CU} - P_\tau^{D,CU} + \hat{p}_\tau^{D\Sigma} - \hat{p}_\tau^{C,DG\Sigma})^- + \hat{\mu}_\tau^C (\hat{A}_\tau^C - P_\tau^{C,AS}) -$$

$$\hat{\rho}_\tau^C P_\tau^{C,AS} + \hat{\mu}_\tau^D (\hat{A}_\tau^D - P_\tau^{D,AS}) - \hat{\rho}_\tau^D P_\tau^{D,AS}],$$

where, the objective function represents a minimization of a sum of an operating cost generated by a centralized energy storage facility during a current period and an expected operating cost generated within a predetermined time range;

$(\square)^+$ and $(\square)^-$ are defined as taking the positive and negative parts in parentheses, namely:

$$(x)^+ = \begin{cases} x, & x \geq 0 \\ 0, & x < 0 \end{cases},$$

$$(x)^- = \begin{cases} x, & x \leq 0 \\ 0, & x > 0 \end{cases};$$

$\Delta t$ is a basic time interval of the model predictive control model;

t is a current period; $\tau$ is any period within 5 minutes immediately after the current period t; $T_t$ is a set of all periods within 5 minutes immediately after the current period t;

$C_t^O$ is a sum of an operating cost generated by a centralized energy storage facility during the period t and an expected operating cost during the period $T_t$;

$\lambda_t$ is a unit price of electricity that a cloud energy storage service provider needs to pay to a grid when the centralized energy storage facility obtains power from the grid during the period t;

$\hat{\lambda}_\tau$ is a predicted value of the unit price of electricity that the cloud energy storage service provider needs to pay to the grid when the centralized energy storage facility obtains power from the grid during the period $\tau$;

$\theta_t$ is a unit price of electricity that the cloud energy storage service provider obtains from the grid when the centralized energy storage facility feeds energy back to the grid during the period t;

$\hat{\theta}_\tau$ is a predicted value of the unit price of electricity that the cloud energy storage service provider obtains from the grid when the centralized energy storage facility feeds energy back to the grid during the period $\tau$;

$P_t^{C,CU}$ is a charging power used by the centralized energy storage facility to provide cloud energy storage services to a cloud energy storage user during the period t;

$P_\tau^{C,CU}$ is a predicted value of the charging power used by centralized energy storage facility to provide the cloud energy storage services to the cloud energy storage user during the period $\tau$;

$P_t^{C,CU}$ is a discharging power used by the centralized energy storage facility to provide the cloud energy storage services to the cloud energy storage user during the period t;

$P_\tau^{D,CU}$ is a predicted value of the discharging power used by the centralized energy storage facility to provide the cloud energy storage services to the cloud energy storage user during the period $\tau$;

$p_t^{D\Sigma}$ is a total discharging power of cloud energy storage users in the period t;

$\hat{p}_\tau^{D\Sigma}$ is a predicted value of the total discharging power of cloud energy storage users during period τ;

$p_t^{C,DG\Sigma}$ is a total charging power of cloud energy storage users using local distributed energy during the period t;

$\hat{p}_\tau^{C,DG\Sigma}$ is a predicted value of the total charging power of cloud energy storage users using local distributed energy during the period τ;

$P_t^{C,AS}$ is a charging power used by centralized energy storage facility to provide auxiliary services to the grid during the period t;

$P_\tau^{C,AS}$ is a predicted value of the charging power used by the centralized energy storage facility to provide the auxiliary services to the grid during the period τ;

$P_t^{D,AS}$ is a discharging power used by the centralized energy storage facility to provide the auxiliary services to the grid during the period t;

$P_\tau^{D,AS}$ is the predicted value of the discharging power used by the centralized energy storage facility to provide auxiliary services to the grid during the period τ;

$A_t^C$ is a charging power required by a cloud energy storage service provider for grid auxiliary services during the period t;

$\hat{A}_\tau^C$ is a predicted value of the charging power required by the cloud energy storage service provider for grid auxiliary services during the period τ;

$A_t^D$ is a discharging power required by the cloud energy storage service provider for grid auxiliary services during the period t;

$\hat{A}_\tau^D$ is a predicted value of the discharging power required by the cloud energy storage service provider for grid auxiliary services during the period τ;

$\mu_t^C$ is a unit price of a penalty electricity fee that needs to be paid to the grid when a charging power of the cloud energy storage service provider fails to meet requirements of the grid auxiliary services during the period t, that is, $A_t^C > P_t^{C,AS}$;

$\hat{\mu}_\tau^C$ is a predicted value of the unit price of the penalty electricity fee that needs to be paid to the grid when a charging power of the cloud energy storage service provider fails to meet requirements of the grid auxiliary services during the period τ, that is, $\hat{A}_\tau^C > P_\tau^{C,AS}$;

$\mu_t^D$ is a unit price of a penalty electricity fee that needs to be paid to the grid when a discharging power of the cloud energy storage service provider fails to meet requirements of the grid auxiliary services during the period t, that is, $A_t^D > P_t^{D,AS}$;

$\hat{\mu}_\tau^C$ is a predicted value of the unit price of the penalty electricity fee that needs to be paid to the grid when a discharging power of the cloud energy storage service provider fails to meet requirements of the grid auxiliary services during the period τ, that is, $\hat{A}_\tau^C > P_\tau^{D,AS}$;

$\rho_t^C$ is a unit energy reward obtained from the grid when the charging power of the cloud energy storage service provider meets requirements of the grid auxiliary services during the period t, that is, $A_t^C \leq P_t^{C,AS}$;

$\hat{\rho}_\tau^C$ is a predicted value of the unit energy reward obtained from the grid when the charging power of the cloud energy storage service provider meets requirements of the grid auxiliary services during the period τ, that is, $\hat{A}_\tau^C \leq P_\tau^{C,AS}$;

$\rho_t^D$ is a unit energy reward obtained from the grid when the discharging power of the cloud energy storage service provider meets requirements of the grid auxiliary services during the period t, that is, $A_t^D \leq P_t^{D,AS}$;

$\hat{\rho}_\tau^D$ is a predicted value of the unit energy reward obtained from the grid when the discharging power of the cloud energy storage service provider meets requirements of the grid auxiliary services during the period τ, that is, $\hat{A}_\tau^D \leq P_\tau^{D,AS}$;

$E_t$ is an electricity amount of the centralized energy storage facility at the end of the period t;

$E_\tau$ is a predicted value of the electricity amount of the centralized energy storage facility at the end of the period τ;

1-2) Suppose constraint conditions of the model predictive control model as:

1-2-1) Charge and discharging power constraints:

$$P_t^{C,CU}, P_\tau^{C,CU}, P_t^{D,CU}, P_\tau^{D,CU} \geq 0$$

$$0 \leq P_t^{C,AS} \leq A_t^C$$

$$0 \leq P_\tau^{C,AS} \leq \hat{A}_\tau^C$$

$$0 \leq P_t^{D,AS} \leq A_t^D$$

$$0 \leq P_\tau^{D,AS} \leq \hat{A}_\tau^D,$$

$$P_t^{C,CU} + P_t^{C,AS} \leq P^{Cap}$$

$$P_\tau^{C,CU} + P_\tau^{C,AS} \leq P^{Cap}$$

$$P_t^{D,CU} + P_t^{D,AS} \leq P^{Cap}$$

$$P_\tau^{D,CU} + P_\tau^{D,AS} \leq P^{Cap}$$

where, $P^{Cap}$ is a power capacity of the centralized energy storage facility;

1-2-2) Minimum power constraints of the centralized energy storage facility:

$$E^{Min} = SOC^{Min} \cdot E^{Cap},$$

where $E^{Min}$ is the minimum power of the centralized energy storage facility; $SOC^{Min}$ is the minimum charge state of the centralized energy storage facility; $E^{Cap}$ is an energy capacity of the centralized energy storage facility;

1-2-3) Electricity constraints of the centralized energy storage facility:

$$E^{Min} \leq E_t, E_\tau \leq E^{Cap};$$

1-2-4) Electricity constraints of the centralized energy storage facility in adjacent periods:

$$E_\tau = (1-S)E_t + \Delta t \left[ \eta^C \left( P_\tau^{C,CU} + P_\tau^{C,AS} \right) - \frac{P_\tau^{D,CU} + P_\tau^{D,AS}}{\eta^D} \right] (\tau - 1 = t)$$

$$E_\tau = (1-S)E_{\tau-1} + \Delta t \left[ \eta^C \left( P_\tau^{C,CU} + P_\tau^{C,AS} \right) - \frac{P_\tau^{D,CU} + P_\tau^{D,AS}}{\eta^D} \right] (\tau - 1 \in T_t),$$

$$E_t = (1-S)E_{t-1} + \Delta t \left[ \eta^C \left( P_t^{C,CU} + P_t^{C,AS} \right) - \frac{P_t^{D,CU} + P_t^{D,AS}}{\eta^D} \right]$$

where: S is a self-discharge rate of the centralized energy storage facility at each time interval Δt, $\eta^C$ is a charging efficiency of the centralized energy storage facility, $\eta^D$ is the discharging efficiency of the centralized energy storage facility; $E_{t-1}$ is an actual power of the centralized energy storage facility obtained by a sensor at the end of the time period t−1, making a power of the centralized energy storage facility at an initial moment as $E_0 = SOC_0 \cdot E^{Cap}$, and $SOC_0$ is an initial charge state of the centralized energy storage facility.

2) At the beginning of a current decision-making cycle, the cloud energy storage service provider obtains operating parameters of the current period t from a grid control center, and the parameters includes: a unit price $\lambda_t$ of an electricity fee that the cloud energy storage service provider needs to pay to the grid when the centralized energy storage facility obtains electricity from the grid during the period t, a unit price $\theta_t$ of the electricity fee that the cloud energy storage service provider receives from the grid when the centralized energy storage facility feeds energy back to the grid during the period t, a charging power $A_t^C$ and a discharging power $A_t^D$ realized by the cloud energy storage service provider required by the grid auxiliary service during the period t, a unit price $\mu_t^C$ of a penalty electricity fee that needs to be paid to the grid when a charging power of the cloud energy storage service provider fails to meet requirements of the grid auxiliary services during the period t, a unit price $\mu_t^D$ of a penalty electricity fee that needs to be paid to the grid when a discharging power of the cloud energy storage service provider fails to meet requirements of the grid auxiliary services during the period t, a unit energy reward $\rho_t^C$ obtained from the grid when the charging power of the cloud energy storage service provider meets requirements of the grid auxiliary services during the period t, a unit energy reward $\rho_t^D$ obtained from the grid when the discharging power of the cloud energy storage service provider meets requirements of the grid auxiliary services during the period t, a total discharging power $p_t^{D\Sigma}$ of cloud energy storage users in the period t that is collected and measured in real time by an application installed on a portable device of the cloud energy storage user, and a total charging power $p_t^{C,DG\Sigma}$ of cloud energy storage user using local distributed energy during the period t.

3) The cloud energy storage service provider predicts the operating parameters within the time range of $T_t$ based on historical data, including: a predicted value $\hat{\lambda}_\tau$ of the unit price of electricity that the cloud energy storage service provider needs to pay to the grid when the centralized energy storage facility obtains power from the grid during the period $\tau$, a predicted value $\hat{\theta}_\tau$ of the unit price of electricity that the cloud energy storage service provider obtains from the grid when the centralized energy storage facility feeds energy back to the grid during the period $\tau$, a predicted value $\hat{p}_\tau^{D\Sigma}$ of the total discharging power of cloud energy storage users during period $\tau$, a predicted value $\hat{p}_\tau^{C,DG\Sigma}$ of the total charging power of cloud energy storage users using local distributed energy during the period $\tau$, a predicted value $\hat{A}_\tau^C$ of the charging power and a predicted value $\hat{A}_\tau^D$ of the discharging power required by the cloud energy storage service provider for grid auxiliary services during the period $\tau$, a predicted value $\hat{\mu}_\tau^C$ of the unit price of the penalty electricity fee that needs to be paid to the grid when a charging power of the cloud energy storage service provider fails to meet requirements of the grid auxiliary services during the period $\tau$, a predicted value $\hat{\mu}_\tau^D$ of the unit price of the penalty electricity fee that needs to be paid to the grid when a discharging power of the cloud energy storage service provider fails to meet requirements of the grid auxiliary services during the period $\tau$, a predicted value $\hat{\rho}_\tau^C$ of the unit energy reward obtained from the grid when the charging power of the cloud energy storage service provider meets requirements of the grid auxiliary services during the period $\tau$, a predicted value $\hat{\rho}_\tau^D$ of the unit energy reward obtained from the grid when the discharging power of the cloud energy storage service provider meets requirements of the grid auxiliary services during the period $\tau$.

4) According to the operating parameters obtained in steps 2) and 3) and the model predictive control model established in step 1), the following decision variables are solved: a charging power $P_t^{C,CU}$ and a discharging power $P_t^{D,CU}$ used by the centralized energy storage facility to provide cloud energy storage services to a cloud energy storage user during the period t, a charging power $P_t^{C,AS}$ and a discharging power $P_t^{D,AS}$ used by centralized energy storage facility to provide auxiliary services to the grid during the period t.

5) The cloud energy storage service provider sets the charging power of the centralized energy storage facility in the period t as $P_t^{C,CU}+P_t^{C,AS}$ and sets the discharging power as $P_t^{D,CU}+P_t^{D,AS}$ according to the decision variables obtained in step 4), and the centralized energy storage facility works according to the set charging power and discharging power.

6) The cloud energy storage service provider obtains an actual value of the power of the centralized energy storage facility at the end of the period t through sensors installed on the centralized energy storage facility as a parameter for the next decision period; return to step 2) to start the next decision period.

The above are only the embodiments of the present disclosure and do not limit the scope of protection of the present disclosure. Any equivalent structure or equivalent process transformation made by using the contents of the description and drawings of the present disclosure, or directly or indirectly applied to other technical fields of related art are included in the protection scope of the present disclosure in the same way.

What is claimed is:

1. An operation decision-making method for centralized cloud energy storage capable of participating in power grid auxiliary services, comprising:
    establishing a model predictive control model, wherein the model predictive control model includes an objective function representing a minimization of a sum of an operating cost generated by a centralized energy storage facility during a current period t and an expected operating cost generated within a predetermined time range $T_t$, and constraint conditions including charge and discharging power constraints, minimum power constraints of the centralized energy storage facility, electricity constraints of the centralized energy storage facility, and electricity constraints of the centralized energy storage facility in adjacent periods;
    obtaining, by a cloud energy storage service provider, operating parameters of the current period t from a grid control center at a beginning of a current decision-making cycle;
    predicting, by the cloud energy storage service provider, operating parameters within the predetermined time range based on historical data;
    obtaining decision variables according to the model predictive control model, the operating parameters of the current period and the operating parameters within the predetermined time range;
    setting, by the cloud energy storage service provider, a charging power of the centralized energy storage facility in the current period t and a discharging power according to the decision variables, so as to enable the centralized energy storage facility to work according to the charging power and the discharging power;
    obtaining, by the cloud energy storage service provider, an actual power of the centralized energy storage facility at an end of the current period t through sensors installed on the centralized energy storage facility as a parameter for a next decision period.

2. The method of claim 1, wherein establishing the model predictive control model comprises:

establishing the objective function as:

$$\min_{P_t^{C,CU}, P_t^{C,AS}, P_t^{D,CU}, P_t^{D,AS}, E_t, P_\tau^{C,CU}, P_\tau^{C,AS}, P_\tau^{D,CU}, P_\tau^{D,AS}, E_\tau} C_t^O =$$

$$\Delta t \big[ \lambda_t \big( P_t^{C,CU} - P_t^{D,CU} + p_t^{D\Sigma} - p_t^{C,DG\Sigma} \big)^+ +$$

$$\theta_t \big( P_t^{C,CU} - P_t^{D,CU} + p_t^{D\Sigma} - p_t^{C,DG\Sigma} \big)^- + \mu_t^C \big( A_t^C - P_t^{C,AS} \big) - \rho_t^C P_t^{C,AS} +$$

$$\mu_t^D \big( A_t^D - P_t^{D,AS} \big) - \rho_t^D P_t^{D,AS} \big] + \sum_{\tau \in T_t} \Delta t \big[ \hat{\lambda}_\tau \big( P_\tau^{C,CU} - P_\tau^{D,CU} + \hat{p}_\tau^{D\Sigma} - \hat{p}_\tau^{C,DG\Sigma} \big)^+ +$$

$$\hat{\theta}_\tau \big( P_\tau^{C,CU} - P_\tau^{D,CU} + \hat{p}_\tau^{D\Sigma} - \hat{p}_\tau^{C,DG\Sigma} \big)^- + \hat{\mu}_\tau^C \big( \hat{A}_\tau^C - P_\tau^{C,AS} \big) -$$

$$\hat{\rho}_\tau^C P_\tau^{C,AS} + \hat{\mu}_\tau^D \big( \hat{A}_\tau^D - P_\tau^{D,AS} \big) - \hat{\rho}_\tau^D P_\tau^{D,AS} \big].$$

where $(\square)^+$ and $(\square)^-$ are defined as taking positive and negative parts in parentheses:

$$(x)^+ = \begin{cases} x, & x \geq 0 \\ 0, & x < 0 \end{cases},$$

$$(x)^- = \begin{cases} x, & x \leq 0 \\ 0, & x > 0 \end{cases};$$

$\Delta t$ is a basic time interval of the model predictive control model;

t is the current period; $\tau$ is a period within 5 minutes immediately after the current period t; $T_t$ is the predetermined time range which is a set of all periods within 5 minutes immediately after the current period t;

$C_t^O$ is a sum of an operating cost generated by the centralized energy storage facility during the current period t and an expected operating cost during the predetermined time range $T_t$;

$\lambda_t$ is a unit price of electricity that a cloud energy storage service provider needs to pay to a grid when the centralized energy storage facility obtains power from the grid during the period t;

$\hat{\lambda}_\tau$ is a predicted value of the unit price of electricity that the cloud energy storage service provider needs to pay to the grid when the centralized energy storage facility obtains power from the grid during the period $\tau$;

$\theta_t$ is a unit price of electricity that the cloud energy storage service provider obtains from the grid when the centralized energy storage facility feeds energy back to the grid during the current period t;

$\hat{\theta}_\tau$ is a predicted value of the unit price of electricity that the cloud energy storage service provider obtains from the grid when the centralized energy storage facility feeds energy back to the grid during the period $\tau$;

$P_t^{C,CU}$ is a charging power used by the centralized energy storage facility to provide cloud energy storage services to a cloud energy storage user during the current period t;

$P_\tau^{C,CU}$ is a predicted value of a charging power used by the centralized energy storage facility to provide the cloud energy storage services to the cloud energy storage user during the period $\tau$;

$P_t^{D,CU}$ is a discharging power used by the centralized energy storage facility to provide the cloud energy storage services to the cloud energy storage user during the current period t;

$P_\tau^{D,CU}$ is a predicted value of a discharging power used by the centralized energy storage facility to provide the cloud energy storage services to the cloud energy storage user during the period $\tau$;

$p_t^{D\Sigma}$ is a total discharging power of cloud energy storage users in the current period t;

$\hat{p}_\tau^{D\Sigma}$ is a predicted value of a total discharging power of cloud energy storage users during the period $\tau$;

$p_t^{C,DG\Sigma}$ is a total charging power of cloud energy storage users using local distributed energy during the current period t;

$\hat{p}_\tau^{C,DG\Sigma}$ is a predicted value of a total charging power of cloud energy storage users using local distributed energy during the period $\tau$;

$P_t^{C,AS}$ is a charging power used by the centralized energy storage facility to provide auxiliary services to the grid during the current period t;

$P_\tau^{C,AS}$ is a predicted value of a charging power used by the centralized energy storage facility to provide the auxiliary services to the grid during the period $\tau$;

$P_t^{D,AS}$ is a discharging power used by the centralized energy storage facility to provide the auxiliary services to the grid during the current period t;

$P_\tau^{D,AS}$ is a predicted value of a discharging power used by the centralized energy storage facility to provide the auxiliary services to the grid during the period $\tau$;

$A_t^C$ is a charging power required by the cloud energy storage service provider for the grid auxiliary services during the current period t;

$\hat{A}_\tau^C$ is a predicted value of a charging power required by the cloud energy storage service provider for the grid auxiliary services during the period $\tau$;

$A_t^D$ is a discharging power required by the cloud energy storage service provider for the grid auxiliary services during the current period t;

$\hat{A}_\tau^D$ is a predicted value of a discharging power required by the cloud energy storage service provider for the grid auxiliary services during the period $\tau$;

$\mu_t^C$ is a unit price of a penalty electricity fee that needs to be paid to the grid when a charging power of the cloud energy storage service provider fails to meet requirements of the grid auxiliary services during the current period t, that is, $A_t^C > P_t^{C,AS}$;

$\hat{\mu}_\tau^C$ is a predicted value of a unit price of a penalty electricity fee that needs to be paid to the grid when a predicted value of a charging power of the cloud energy storage service provider fails to meet requirements of the grid auxiliary services during the period $\tau$, that is, $\hat{A}_\tau^C > P_\tau^{C,AS}$;

$\mu_t^D$ is a unit price of a penalty electricity fee that needs to be paid to the grid when a discharging power of the cloud energy storage service provider fails to meet requirements of the grid auxiliary services during the period t, that is, $A_t^D > P_t^{D,AS}$;

$\hat{\mu}_\tau^D$ is a predicted value of the unit price of the penalty electricity fee that needs to be paid to the grid when a predicted value of a discharging power of the cloud energy storage service provider fails to meet requirements of the grid auxiliary services during the period $\tau$, that is, $\hat{A}_\tau^D > P_\tau^{D,AS}$;

$\rho_t^C$ is a unit energy reward obtained from the grid when the charging power of the cloud energy storage service provider meets requirements of the grid auxiliary services during the current period t, that is, $A_t^C \leq P_t^{C,AS}$;

$\hat{\rho}_\tau^C$ is a predicted value of the unit energy reward obtained from the grid when a predicted value of the charging power of the cloud energy storage service provider meets requirements of the grid auxiliary services during the period $\tau$, that is, $\hat{A}_\tau^C \leq P_\tau^{C,AS}$;

$\rho_t^D$ is a unit energy reward obtained from the grid when the discharging power of the cloud energy storage service provider meets requirements of the grid auxiliary services during the current period t, that is, $A_t^D \leq P_t^{D,AS}$;

$\hat{\rho}_\tau^D$ is a predicted value of the unit energy reward obtained from the grid when a predicted value of the discharging power of the cloud energy storage service provider meets requirements of the grid auxiliary services during the period τ, that is, $\hat{A}_\tau^D \leq P_\tau^{D,AS}$;

$E_t$ is an electricity amount of the centralized energy storage facility at the end of the current period t;

$E_\tau$ is a predicted value of the electricity amount of the centralized energy storage facility at an end of the period τ.

3. The method of claim 1, wherein establishing the model predictive control model comprises:

establishing the constraint conditions as:
the charge and discharging power constraints:

$$P_t^{C,CU}, P_\tau^{C,CU}, P_t^{D,CU}, P_\tau^{D,CU} \geq 0$$

$$0 \leq P_t^{C,AS} \leq A_t^C$$

$$0 \leq P_\tau^{C,AS} \leq \hat{A}_\tau^C$$

$$0 \leq P_t^{D,AS} \leq A_t^D$$

$$0 \leq P_\tau^{D,AS} \leq \hat{A}_\tau^D,$$

$$P_t^{C,CU} + P_t^{C,AS} \leq P^{Cap}$$

$$P_\tau^{C,CU} + P_\tau^{C,AS} \leq P^{Cap}$$

$$P_t^{D,CU} + P_t^{D,AS} \leq P^{Cap}$$

$$P_\tau^{D,CU} + P_\tau^{D,AS} \leq P^{Cap}$$

where, $P^{Cap}$ is a power capacity of the centralized energy storage facility;

the minimum power constraints of the centralized energy storage facility:

$$E^{Min} = SOC^{Min} \cdot E^{Cap},$$

where $E^{Min}$ is the minimum power of the centralized energy storage facility; $SOC^{Min}$ is the minimum charge state of the centralized energy storage facility; $E^{Cap}$ is an energy capacity of the centralized energy storage facility;

the electricity constraints of the centralized energy storage facility:

$$E^{Min} \leq E_p, E_\tau \leq E^{Cap};$$

the electricity constraints of the centralized energy storage facility in adjacent periods:

$$E_\tau = (1-S)E_t + \Delta t \left[\eta^C(P_\tau^{C,CU} + P_\tau^{C,AS}) - \frac{P_\tau^{D,CU} + P_\tau^{D,AS}}{\eta^D}\right] (\tau - 1 = t)$$

$$E_\tau = (1-S)E_{\tau-1} + \Delta t \left[\eta^C(P_\tau^{C,CU} + P_\tau^{C,AS}) - \frac{P_\tau^{D,CU} + P_\tau^{D,AS}}{\eta^D}\right] (\tau - 1 \in T_t),$$

$$E_t = (1-S)E_{t-1} + \Delta t \left[\eta^C(P_t^{C,CU} + P_t^{C,AS}) - \frac{P_t^{D,CU} + P_t^{D,AS}}{\eta^D}\right]$$

where: S is a self-discharge rate of the centralized energy storage facility at each time interval Δt, $\eta^C$ is a charging efficiency of the centralized energy storage facility, $\eta^D$ is the discharging efficiency of the centralized energy storage facility; $E_{t-1}$ is an actual power of the centralized energy storage facility obtained by a sensor at the end of the time period t−1, making a power of the centralized energy storage facility at an initial moment as $E_0 = SOC_0 \cdot E^{Cap}$, and $SOC_0$ is an initial charge state of the centralized energy storage facility.

4. The method of claim 1, wherein obtaining, by a cloud energy storage service provider, the operating parameters of the current period t from the grid control center at the beginning of the current decision-making cycle comprises:

obtaining a unit price $\lambda_t$ of an electricity fee that the cloud energy storage service provider needs to pay to the grid when the centralized energy storage facility obtains electricity from the grid during the current period t, a unit price $\theta_t$ of the electricity fee that the cloud energy storage service provider receives from the grid when the centralized energy storage facility feeds energy back to the grid during the current period t, a charging power $A_t^C$ and a discharging power $A_t^D$ realized by the cloud energy storage service provider required by the grid auxiliary service during the current period t, a unit price $\mu_t^C$ of a penalty electricity fee that needs to be paid to the grid when a charging power of the cloud energy storage service provider fails to meet requirements of the grid auxiliary services during the current period t, a unit price $\mu_t^D$ of a penalty electricity fee that needs to be paid to the grid when a discharging power of the cloud energy storage service provider fails to meet requirements of the grid auxiliary services during the period t, a unit energy reward $\rho_t^C$ obtained from the grid when the charging power of the cloud energy storage service provider meets requirements of the grid auxiliary services during the current period t, a unit energy reward $\rho_t^D$ obtained from the grid when the discharging power of the cloud energy storage service provider meets requirements of the grid auxiliary services during the current period t, a total discharging power $p_t^{D\Sigma}$ of cloud energy storage users in the period t that is collected and measured in real time by an application installed on a portable device of the cloud energy storage user, and a total charging power $p_t^{C,DG\Sigma}$ of cloud energy storage user using local distributed energy during the current period t.

5. The method of claim 1, wherein predicting, by the cloud energy storage service provider, the operating parameters within the predetermined time range based on historical data comprises:

predicting a predicted value $\hat{\lambda}_\tau$ of the unit price of electricity that the cloud energy storage service provider needs to pay to the grid when the centralized energy storage facility obtains power from the grid during the period τ, a predicted value $\hat{\theta}_\tau$ of the unit price of electricity that the cloud energy storage service provider obtains from the grid when the centralized energy storage facility feeds energy back to the grid during the period τ, a predicted value $\hat{p}_\tau^{D\Sigma}$ of the total discharging power of cloud energy storage users during period τ, a predicted value $\hat{p}_\tau^{C,DG\Sigma}$ of the total charging power of cloud energy storage users using local distributed energy during the period τ, a predicted value $\hat{A}_\tau^C$ of the charging power and a predicted value $\hat{A}_\tau^D$ of the discharging power required by the cloud energy storage service provider for grid auxiliary services during the period τ, a predicted value $\hat{\mu}_\tau^C$ of the unit price of the penalty electricity fee that needs to be paid to the grid when a predicted value of a charging power of the cloud energy storage service provider fails to meet requirements of the grid auxiliary services during the period τ, a predicted value $\hat{\mu}\tau^D$ of the unit price of the penalty electricity fee that needs to be paid to the grid when a predicted value of a discharging power of the cloud energy storage service provider fails to meet requirements of the grid auxiliary services during the period τ, a predicted value $\hat{\rho}_\tau^C$ of the unit energy reward obtained from the grid when the charging power of the cloud energy storage service provider meets requirements of the grid auxiliary services during the period τ, a predicted value $\hat{\rho}_\tau^D$ of the unit energy reward obtained from the grid when the discharging power of the cloud energy storage service provider meets requirements of the grid auxiliary services during the period τ.

6. The method of claim 1, wherein obtaining the decision variables comprises:

obtaining a charging power $P_t^{C,CU}$ and a discharging power $P_t^{D,CU}$ used by the centralized energy storage facility to provide cloud energy storage services to a cloud energy storage user during the current period t, a charging power $P_t^{C,AS}$ and a discharging power $P_t^{D,AS}$ used by centralized energy storage facility to provide auxiliary services to the grid during the current period t.

7. The method of claim 1, wherein setting, by the cloud energy storage service provider, the charging power of the centralized energy storage facility in the current period t and the discharging power according to the decision variables comprises:

setting, by the cloud energy storage service provider, the charging power of the centralized energy storage facility in the current period t as $P_t^{C,CU}+P_t^{C,AS}$ and the discharging power as $P_t^{D,CU}+P_t^{D,AS}$ according to the decision variables.

* * * * *